United States Patent
Holt

[11] 4,058,110
[45] Nov. 15, 1977

[54] WIDE ANGLE SOLAR HEAT COLLECTION SYSTEM

[76] Inventor: F. Sheppard Holt, 46 Emerson Road, Winchester, Mass. 01890

[21] Appl. No.: 602,043

[22] Filed: Aug. 5, 1975

[51] Int. Cl.² .............................................. F24J 3/02
[52] U.S. Cl. .............................. 126/271; 350/175 SL; 350/175 R
[58] Field of Search ............... 126/270, 271; 237/1 A; 350/175 R, 175 SL

[56] References Cited

U.S. PATENT DOCUMENTS

| | | | |
|---|---|---|---|
| 1,093,498 | 4/1914 | Thring | 126/271 |
| 1,345,758 | 7/1920 | Folsom | 126/271 |
| 1,673,429 | 6/1928 | Vinson | 126/271 |
| 2,259,902 | 10/1941 | McCain | 126/271 |
| 2,467,885 | 4/1949 | Freund | 126/271 |
| 3,227,153 | 1/1966 | Godel et al. | 126/271 |
| 3,321,012 | 5/1967 | Hervey | 126/271 |
| 3,866,285 | 2/1975 | Clark | 126/271 |

*Primary Examiner*—Kenneth W. Sprague
*Attorney, Agent, or Firm*—Joseph E. Rusz; Sherman H. Goldman

[57] ABSTRACT

A cylindrical reflector or lens is used under aberrated conditions in conjunction with an enlarged primary collector to obtain wide angle scanning performance that will allow concentration of solar radiation without extensive tracking.

2 Claims, 11 Drawing Figures

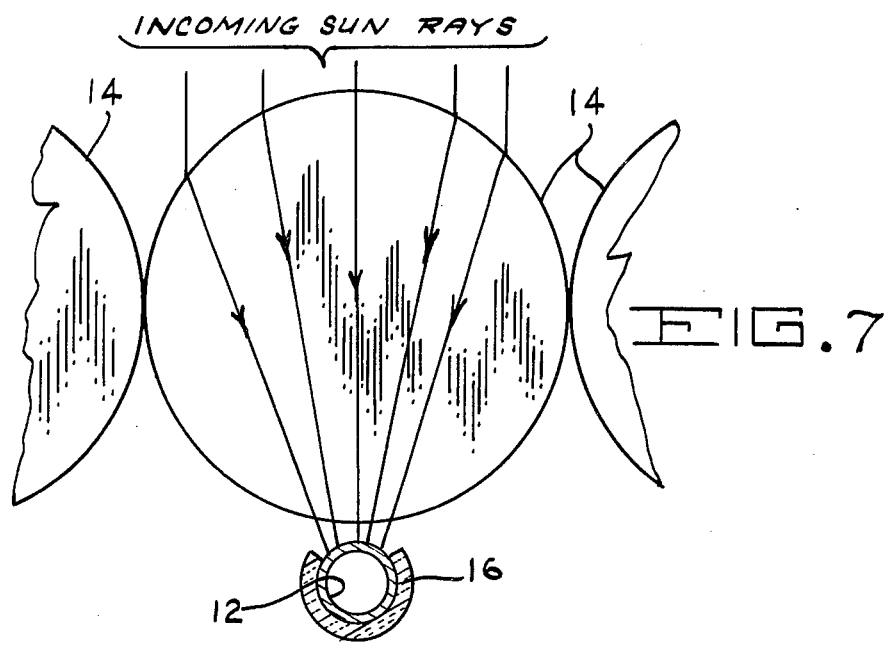
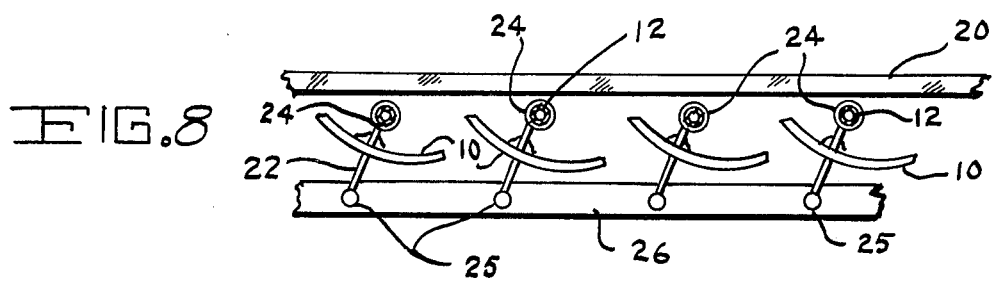
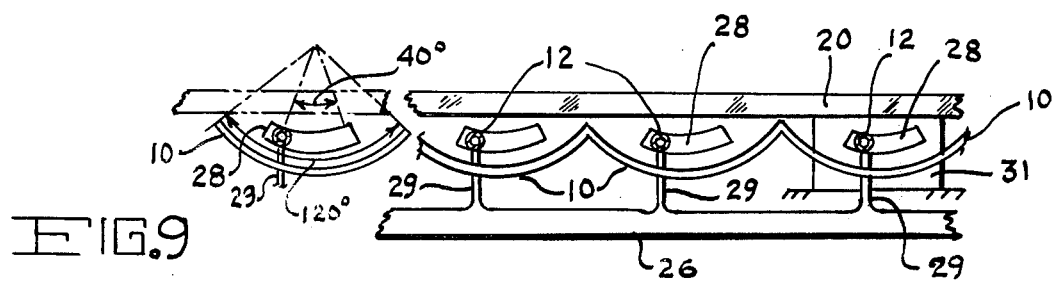
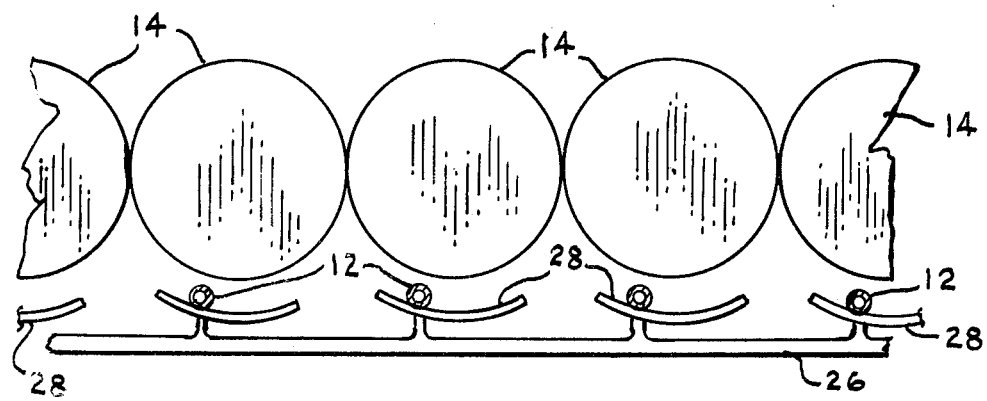

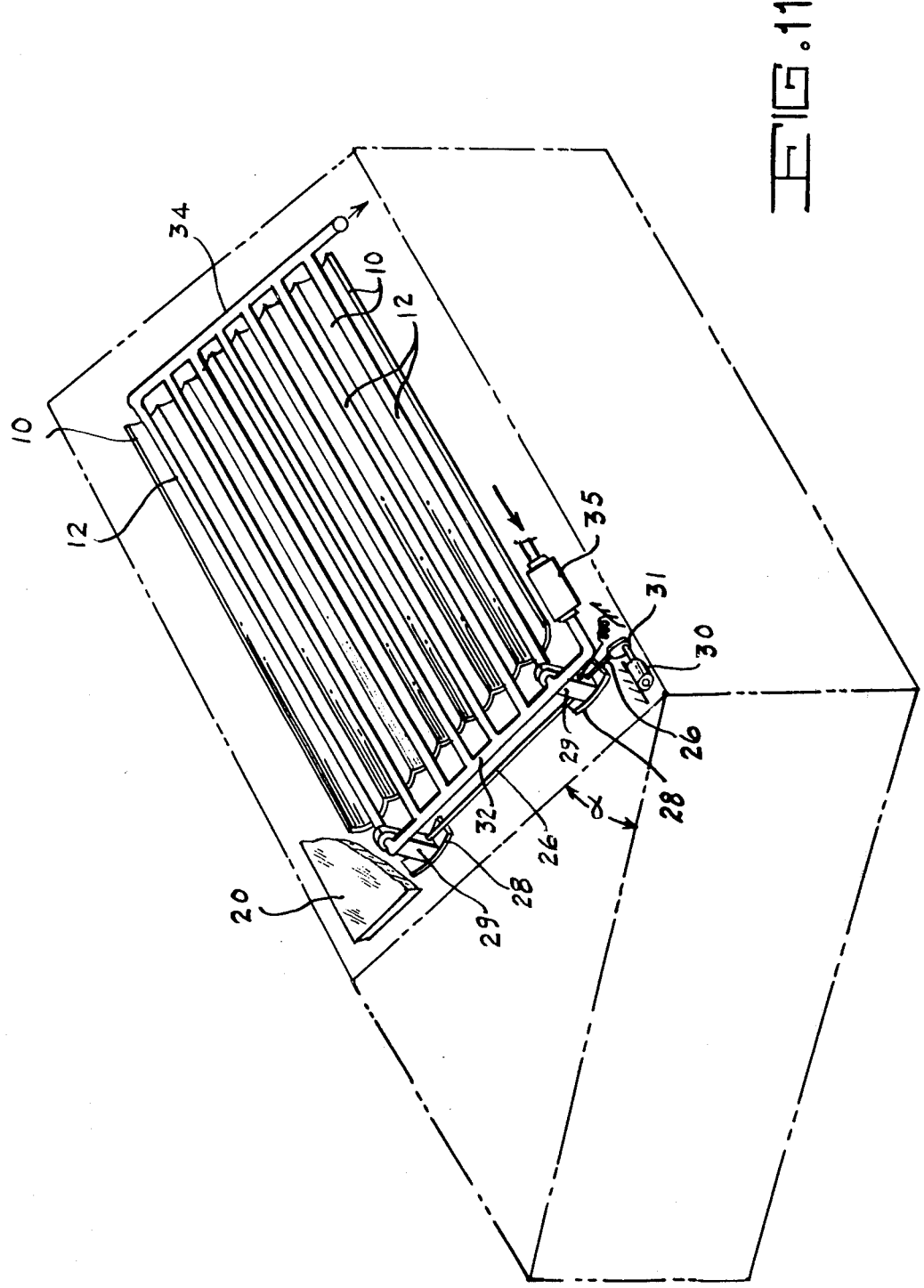

WIDE ANGLE SOLAR HEAT COLLECTION SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to solar heat collection devices and more particularly to one which utilizes a cylindrical reflector or lens under aberrated conditions to eliminate and/or reduce the tracking of the sun over a period of days, while at the same time achieving a concentration of solar radiation suitable for use with a solar heating or energy storing system.

Previously, solar radiation collectors were either flat area reception devices for moderate heat temperatures or focusing devices such as paraboloids, parabolic cylinders or lenses to concentrate the solar radiation at relatively high temperatures. The flat area devices are capable of collecting sufficient heat only for moderate heating temperatures while the narrow angle receptivity in at least one plane of scan of the focusing type devices requires continuous scanning in order to track the sun's path to obtain high temperatures. Complicated tracking systems have raised the costs of this type of device to the extent that it has not become practical.

SUMMARY OF THE INVENTION

This invention provides for the utilization of cylindrical reflectors or lenses operating under aberrated conditions in conjunction with an enlarged primary collector to produce scanning properties that allow for the tracking of the sun for extended periods of time with no mechanical motion.

Accordingly, it is a primary object of this invention to provide a solar heat collection system which utilizes cylinder reflectors or lenses operating under aberrated conditions.

It is another object of this invention to provide a solar heat collection system which allows for the tracking of the sun for extended periods without requiring mechanical motion.

It is still another object of this invention to provide a solar heat collection system which provides a concentration of solar radiation for high temperature heating.

It is a further object of this invention to provide a solar heat collection system which eliminates complex tracking systems.

It is a still further object of this invention to provide a solar heat collection system which is easily adapted to conventional solar heating equipment.

Another object of this invention is the provision of a solar heat collection system which is lower in cost than those currently available with similar heat collecting capabilities.

Still another object of this invention involves the provision of a solar heat collection system with simplified scanning arrangements.

A further object of this invention is to provide a solar energy collection system from which higher circulant temperatures are available, thereby leading to a more efficient solar heating system.

A still further object of this invention is to provide a solar energy collection system from which higher circulant temperatures are available, thereby allowing for use of the system for refrigeration purposes.

It is another object of this invention to provide a solar energy collection system which utilizes right circular cylinder reflectors or circular cylinder lenses to partially focus solar energy, thereby allowing for the production of higher temperatures than has been achieved using existing, wide angle, non-tracking devices.

It is still another object of this invention to provide a solar energy collection system that utilizes a parabolic cylinder reflector operating in a defocused condition to produce higher temperatures than have been achieved using existing, wide angle, nontracking devices.

A further object of this invention is to provide a solar heat collection system which is easy and economical to produce of conventional, currently available materials that lend themselves to standard mass production manufacturing techniques.

These and other advantages, features and objects of the invention will become more apparent from the following description taken in conjunction with the illustrative embodiments in the accompanying drawings.

BRIEF DESCRIPTION OF THE DRAWINGS

FIG. 7 is a diagrammatic representation of heat collection units of the circular cylinder lens type with ray tracing that illustrates the inherent aberration of such a circular system;

FIG. 8 is a schematic representation of a scanning system for either the circular or the parabolic type cylindrical reflector wherein the motion of the reflector is a rotation about the primary collector;

FIG. 9 shows a scanning system applicable to the circular cylindrical reflector wherein the reflector stays fixed and the feed is moved on a circular arc concentric with the reflector;

FIG. 10 is a diagrammatical representation of an array of lens collectors that utilize the motion of the primary heat collector to achieve scan; and FIG. 11 is a schematic illustration of a roof installation of a solar heat collection system.

DESCRIPTION OF THE PREFERRED EMBODIMENT

Figure 1:
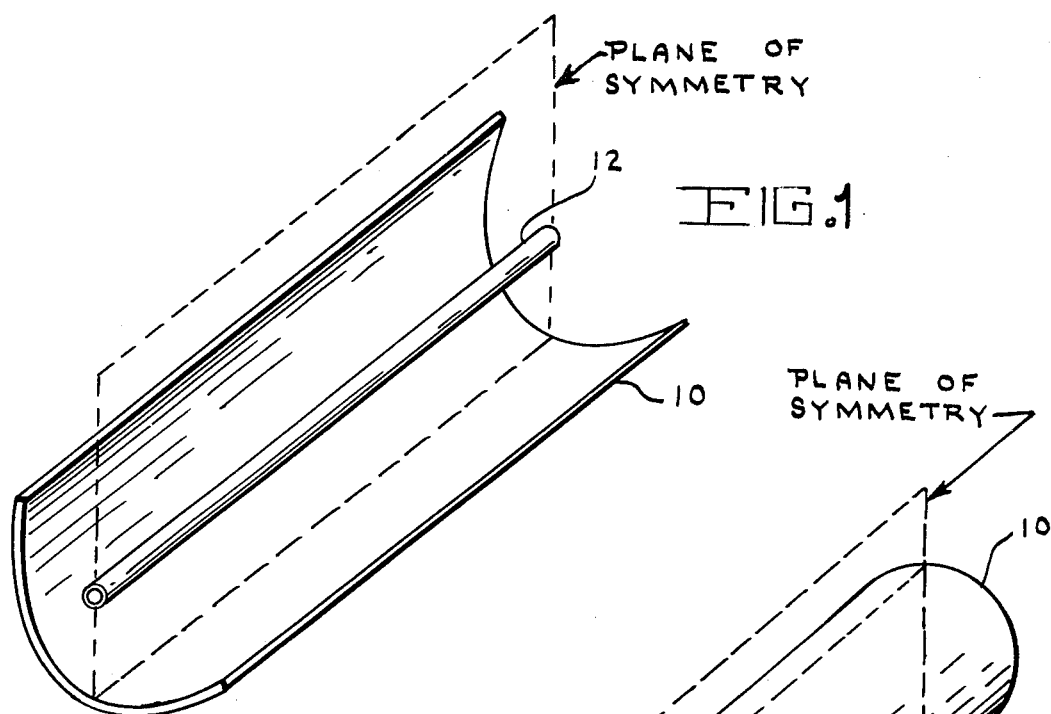
FIGS. 1 and 2 are pictorial representations of a cylindrical reflector and lens, respectively, in conjunction with primary collectors. These Figures serve to specify the plane of symmetry for the reflector system and the lens system.
Figure 2:
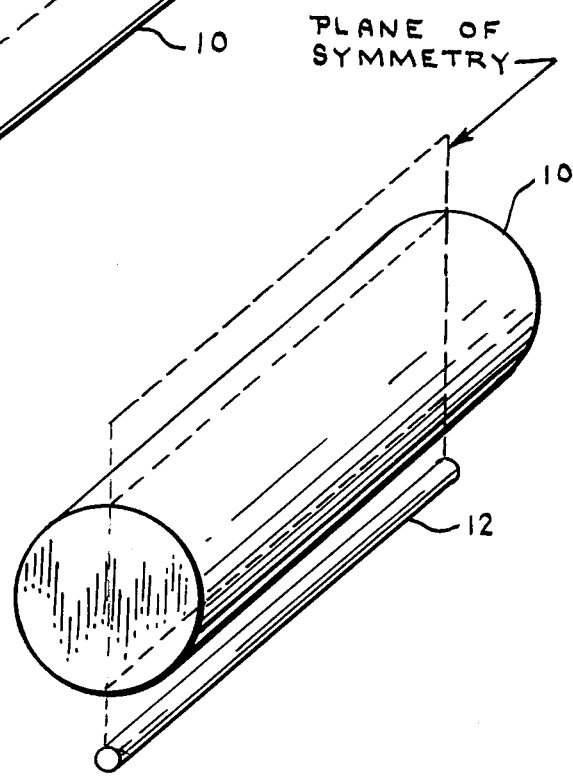

A circular cylinder reflector or lens can be used with a properly designed primary collector to achieve heat concentrations of up to 7.5 times those obtained with flat plate systems. FIG. 1 shows a cylindrical reflector 10 with a primary heat collector 12 located in the focal region and FIG. 2 shows a circular cylindrical lens 14 mounted above a primary heat collector 12 located in the lens focal region. The plane of symmetry is clearly depicted in both Figures It is an inherent, well-known property of cylindrical systems that their focusing properties remain essentially unchanged as the direction of the incident energy is scanned over a very wide range of angles in the plane of symmetry. The incident energy in the plane of symmetry can vary ±60° in the plane before there is a drop of 50% in energy applied to the primary collector; however, normally in a well focused system, the scan is only a couple of degrees. With the instant invention a ±10°-12° scan perpendicular to the plane of symmetry produces the 50% loss.

Figure 3:
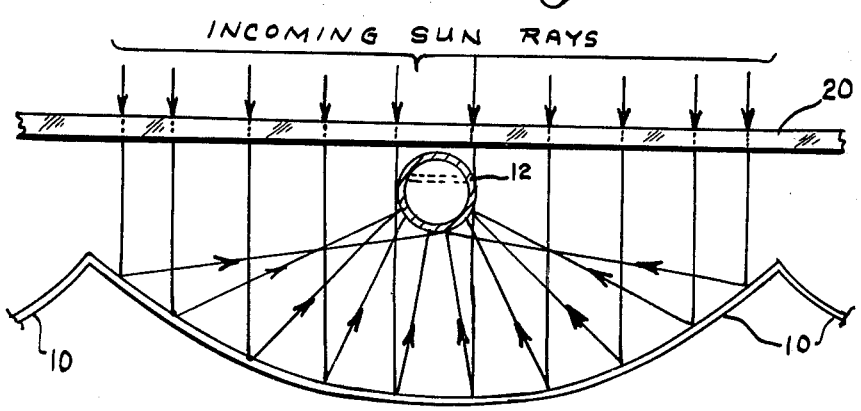
FIG. 3 is a diagrammatic representation, partly in cross section, of a circular cylinder reflector in conjunction with an enlarged primary collector. The incoming rays are parallel to the plane of symmetry and the reflected rays illustrate the aberration characteristic of circular systems wherein the primary collector intercepts all rays.

The schematic representation of FIG. 3, showing the cross section of a solar heat collection system in a plane normal to the plane of symmetry, utilizes a reflector or a series of reflectors 10 above each of which is mounted a primary heat collector 12. A circulant liquid is made to circulate within the primary heat collector 12 to provide for heat transfer to a storage arrangement, for example. In conventional installations a transparent weather protection sheet 20 would be provided over the reflectors and collectors. Proper design of the primary collector 12 consists of (a) ray tracing the desired portion of the reflector or lens in a plane normal to the plane of symmetry, (b) scanning the direction of the incoming energy in this normal plane by the desired amount, and (c) then choosing a collector configuration as small as possible that intercepts as many rays as possible.

Figure 4:
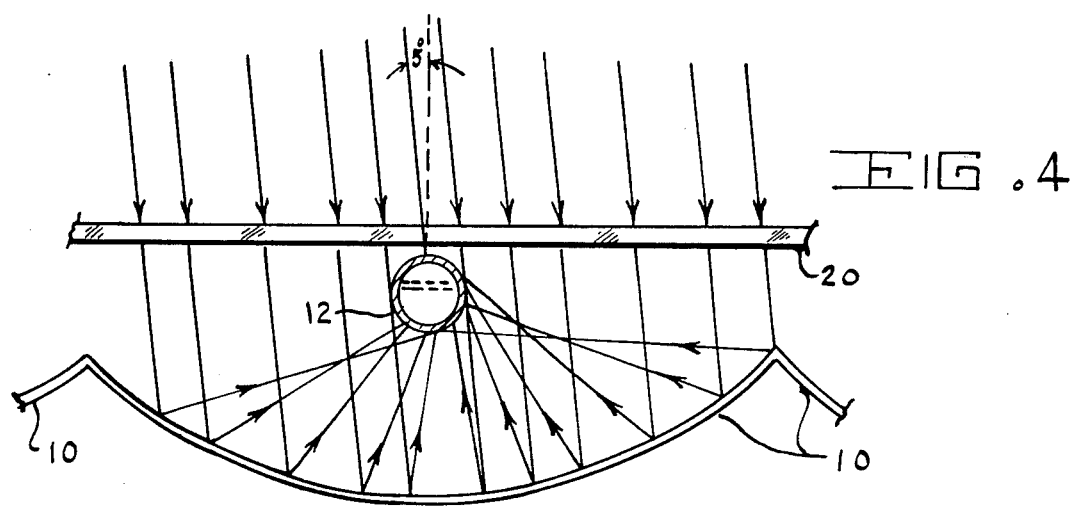
FIG. 4 is a diagrammatic representation of the same system as shown in FIG. 3 but with the incoming rays tilted 5° relative to the plane of symmetry with, as in FIG. 3, the primary collector intercepting all rays.

FIG. 4 illustrates the results obtained with a 5° tilt of the incoming energy relative to the plane of symmetry. The ray tracings of FIGS. 3 and 4, if superimposed, contain sufficient information to determine the proper location and size for the circular primary collector 12. The design shown in these Figures is for the case where the desired sector of the circular reflector is about 80° and the desired scan in a plane normal to the plane of symmetry is ±5°. The ray traces of FIGS. 3 and 4 show that the primary collector need not be circular in cross section but could be considerably flattened on top to reduce collector cross section (see dotted lines in collectors 12). It is a property of the circular geometry that the aperture efficiency of the system decreases slowly beyond the design scan angles. For the design shown in FIGS. 3 and 4 scanning out to ±10.5° in planes normal to the plane of symmetry decreases the aperture efficiency by only about 2 db. Depending on the efficiency loss that can be tolerated, this system can be used well beyond the illustrated scan value of ±5°.

Figure 5:
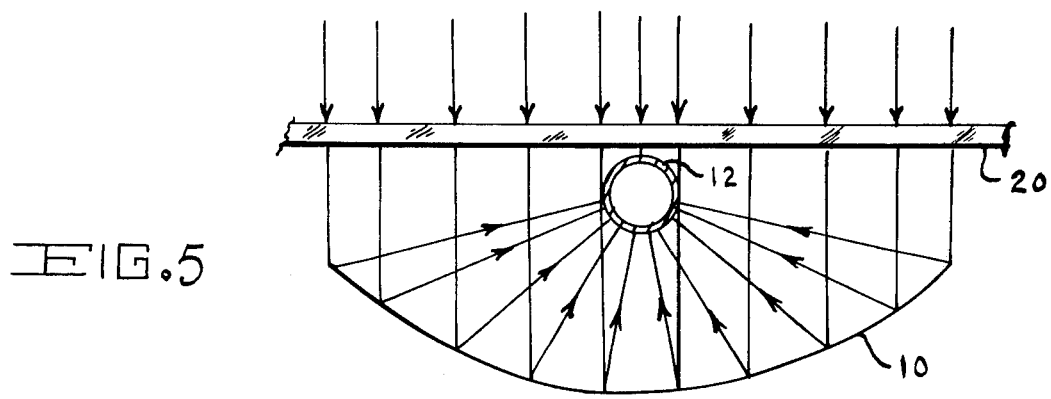
FIG. 5 shows a cross section of a parabolic cylinder reflector in conjunction with an enlarged feed where the incoming rays are parallel to the plane of symmetry and the reflected rays indicate a defocused condition at all points where they intersect the surface of the primary collector.
Figure 6:
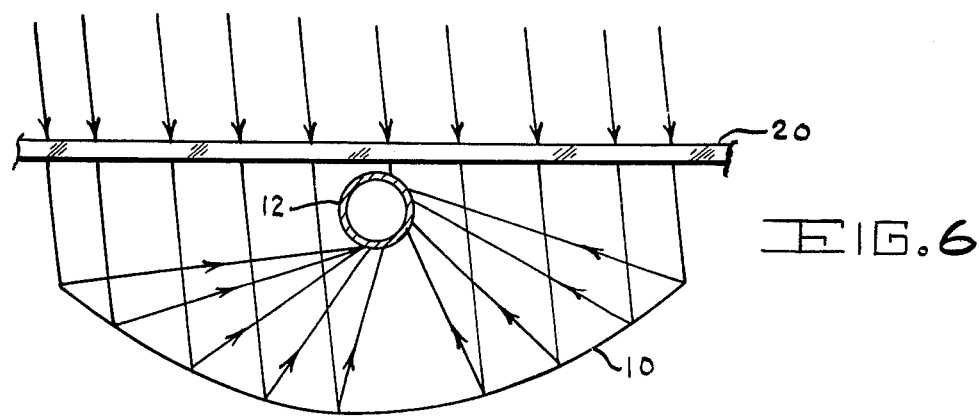
FIG. 6 illustrates the same system as FIG. 5 but with the incoming rays tilted 5° relative to the plane of symmetry with the primary collector intercepting all rays thereby illustrating by the symmetry of the system that the same condition will hold if the incoming rays make an angle of ± 5° with the plane of symmetry.

FIGS. 5 and 6 are utilized to illustrate the scan properties with respect to a parabolic cylinder reflector. In these Figures the reflector 10 is a parabolic cylinder which is deliberately made to have an aberrated condition such that the normal line of focus of a conventional parabolic cylinder now has an area in which the energy collected by the reflector is focused. The collector 12, as described relative to FIGS. 3 and 4, would have a circulant liquid therein for providing a heat transfer medium. Also, as in the previously described conventional installation, a transparent weather protection sheet 20 is placed above the system. The ray tracings of FIG. 5 illustrate the heat collection system in a plane normal to the plane of symmetry while FIG. 6 has a 5° tilt in the incoming rays relative to the plane of symmetry. In both instances the location of the primary collector 12 is chosen to collect all of the energy incident upon the collectors. The circular cylinder of FIGS. 3 and 4 have fabrication and economical advantages over the parabolic cylinder since the inherent symmetry of the circular reflector makes it easier and less expensive to construct and also to test for tolerance maintenance.

In contrast to circular systems the parabolic cylinder reflector is well focused for incident rays parallel to the plane of symmetry but suffers increasing aberrations as the incident rays are scanned in planes normal to the plane of symmetry. FIGS. 5 and 6 show that the parabolic shape performs as well as the circular shape out to the design scan angle ±5°. However, beyond ±5° scan the aperture efficiency of the parabolic system decreases more rapidly than with the circular geometry and is down about 9 db at a scan angle of ±10.5°.

FIG. 7 illustrates a series of circular cylindrical lenses 14 each of which would have a primary collector 12 with insulation 16 around that portion of the feed upon which the incoming rays do not impinge. Proper design of the primary collector is carried out using a ray tracing technique entirely similar to that described above for the design of the system shown in FIG. 3. Again, as described relative to FIG. 3, a circulant liquid is provided within the collector 12.

It is primarily the property of having reflectors or lenses with moderate scanning capability in planes normal to the plane of symmetry that enables the instant device to produce superior tracking performance with a structure that differs from other focusing devices which have been used for solar energy collection, for example, parabolic cylinders operating in a perfectly focused condition. Circular systems inherently possess aberrations but circular symmetry insures that the degree of aberration does not change with scan angle in planes normal to the plane of symmetry. It is this wide angle property that allows properly designed primary collectors to produce systems with moderate scanning properties normal to the plane of symmetry. Such systems can still achieve sufficient wide angle reception for useful application and simultaneously concentrate the incoming solar radiation by a factor as high as 7.5. This type of arrangement, when given an east-west orientation of the collectors, enables the sun to be tracked throughout the major portion of its useful arc by means of mechanical scanning in small steps occurring at intervals in the order of many days. For example, with a concentration ratio of 7.5 tracking could be achieved with step scans of from 0.5° to 4° at ten day intervals. It is characteristic of these systems that the higher the concentration ratio the smaller and more frequent the needed step scans.

This invention contemplates both manual and automatic scanning and could be achieved by moving the primary collector relative to the reflector or lens or vice versa. Moving the primary collector makes it easier to maintain a fixed outer surface to the configuration; however, there is some reduction in aperture efficiency.

Examples of two different scanning systems for reflector type collectors are shown in FIGS. 8 and 9. As can be seen in these Figures the transparent weather sheet 20 covers the primary heat collectors 12 and its associated cylindrical reflectors 10.

In FIG. 8 each of the reflectors is secured to a link 22 which is journaled about its primary heat collectors 12 at 24. This arrangement would be at the ends of the reflectors. The ends of the links 22, remote from the primary heat collectors 12, are connected with and pivoted at 25 to a scan control link 26. A horizontally applied force causes movement of the scan control link 26 to effect a rotation of the right circular cylinder reflectors 10. An alternative arrangement (not shown) would be to provide a pinion gear on the outer periphery of the journal for a rack or motor driven gear in mesh therewith. The embodiment of FIG. 8 could be used for either the right, circular cylinder reflectors or the defocused parabolic reflectors.

FIG. 9 represents an embodiment wherein the primary collectors 12 are moved with respect to the right circular cylinder reflectors 10 along an arc of approximately 40° about the same center of curvature as that of the reflectors. The ends of the primary collectors 12 collocated at the ends of the reflectors 10 could be placed in a slotted cam or guide arrangement 28 which would limit their positions to points along the 40° arc. A scan control linkage bar 26 in this case would be secured to the primary collectors 12 by a rigid link 29 such that a generally horizontal application of force would cause the collectors 12 to travel along the guide slots 28. Each slot 28 could be provided in an end plate 31 as depicted schematically at the right end of FIG. 6.

It should be understood that the means for operating the embodiments of FIGS. 8 and 9 do not have to be applied to each reflector or collector. Only the end elements need be controlled when the elements are ganged. Also, any means for producing the appropriate motions may be utilized. When lenses are used, the primary heat collector 12 is moved on an arc concentric with the lens as is best illustrated in FIG. 10. In this instance the scan control bar 26 rigidly connected the primary collectors 12 which are provided with guides 28 in order to control their position along the arc and operates in the manner similar to that described relative to FIG. 9.

For practical operation of a system a tolerance of ±0.03125 inch in circular cross section contour of the reflectors is probably sufficient for cross section apertures on the order of one foot. Locally, however, the surface should be optically smooth and highly reflective. Lenses should have surfaces which are locally optically smooth and the lens material should be highly transparent.

It is submitted that systems of the type described are able to achieve a concentration of solar radiation to produce temperatures in a static black body collector in the order of 500° C. The heat available for transfer to a circulant liquid such as water or ethylene glycol depends upon the materials utilized in the construction as well as the shape and surface finish of the primary collectors. The rate of flow of the circulant, the surface finish of the reflector or lens and the amount of reradiation of the primary collector also affect the heat transfer efficiency. Insulation 16 may be provided, as is conventional in the art, to insulate the primary heat collectors everywhere except where they intercept the focused solar energy. Thermal insulation, of course, is provided for other pipes in the system which conduct the circulant. Careful control of the solar and surface finish of the active absorption portion of the primary heat collector can be expected to optimize heat transfer.

A typical installation of an array of the reflector type collectors 10 is illustrated in FIG. 11 wherein the system is mounted at approximately the local latitude angle α, which is best achieved by setting the pitch of the roof at this angle. The cover 20, illustrated in prior Figures, has been cut away in the interest of clarity. The orientation of a house in the northern hemisphere utilizing this system is best arranged with its longitudinal axis on an east-west line with the system being provided on the southern exposure. One function of the transparent weather protection sheet 20 is to act as a thermal insulation layer such that the space thereunder forms a heat trap. In FIG. 11 the circular cylinder reflectors may be moved for tracking as illustrated in FIG. 8 or the primary heat collectors 12 may be moved as shown in FIG. 9 with right circular cylinder reflectors. The schematic representation shown in the Figure comprises a drive system wherein the primary heat collectors 12 have rigid extensions 29 which ride on cam guides 28 such that motion of the scan control link 26 causes movement of the collectors 12 along an arc concentric with that formed by the reflectors 10. Movement of the link or bar 26 may be effected manually or by a motor 30 having a cam 31 on the end of the shaft to apply a force in the horizontal direction to element 26. Of course, any means for causing movement of bar 26 would be acceptable. The collection system would have a coolant pump 35 attached to the manifold 32 for pumping the circulant through the system. The collector system of this invention could be applied to any solar heating system, for example, that described in the patent application of Carlyle J. Sletten, titled "Solar Energy Apparatus and Method" filed on even date herewith.

Although the invention has been described with reference to particular embodiments, it will be understood to those skilled in the art that the invention is capable of a variety of alternative embodiments within the spirit and scope of the appended claims.

I claim:

1. A solar energy collection system comprising right circular cylinder lens means for aberrated focusing of solar energy such that said lens means exhibits moderate scan properties in a plane normal to the plane of symmetry; and a hollow body located in the focal region of said lens means, said body having an inlet and an outlet to render it capable of having a circulant flow therethrough, said body being of a size to accommodate focused solar energy received over a moderate scan angle in a plane normal to the plane of symmetry of said means.

2. A system as defined in claim 1 including means for causing relative movement between said body and said lens means in order to maintain energy received by said lens means to be focused on said body.

* * * * *